(12) United States Patent
Sevastian

(10) Patent No.: US 6,579,000 B2
(45) Date of Patent: Jun. 17, 2003

(54) CHAMELEON SIGNAL LENS

(76) Inventor: Nicolae Radu Sevastian, 1095 Riverside Dr. E., Windsor, Ontario (CA), N9A 2T6

( * ) Notice: Subject to any disclaimer, the term of this patent is extended or adjusted under 35 U.S.C. 154(b) by 0 days.

(21) Appl. No.: 09/758,501

(22) Filed: Jan. 12, 2001

(65) Prior Publication Data

US 2002/0126508 A1 Sep. 12, 2002

Related U.S. Application Data

(63) Continuation-in-part of application No. 09/616,746, filed on Jul. 14, 2000.

(51) Int. Cl.⁷ .................................................. F21V 8/00

(52) U.S. Cl. ...................... 362/583; 362/554; 390/472; 390/815.42

(58) Field of Search ................................. 362/583, 551, 362/554; 340/472, 815.42

(56) References Cited

U.S. PATENT DOCUMENTS

| | | | | |
|---|---|---|---|---|
| 5,010,319 A | * | 4/1991 | Killinger | 340/468 |
| 5,295,050 A | * | 3/1994 | Helstern et al. | 340/815.41 |
| 5,329,386 A | * | 7/1994 | Birecki et al. | 349/159 |
| 6,042,256 A | * | 3/2000 | Gothard | 362/153 |
| 6,195,016 B1 | * | 2/2001 | Shankle et al. | 340/815.42 |
| 6,195,477 B1 | * | 2/2001 | Denuto et al. | 362/551 |

* cited by examiner

Primary Examiner—Sandra O'Shea
Assistant Examiner—James W. Cranson
(74) Attorney, Agent, or Firm—Carrier, Blackman & Associates, P.C.; Joseph P. Carrier; William D. Blackman

(57) ABSTRACT

The invention is a lens. The light transmitting portion of the lens comprises a plurality of fiber optic strands arranged parallel to each other in a side-by-side manner, forming a planar layer. The fiber optic strands are also inclined at an angle to a surface of the lens. This defeats any reflection from the interior of the lens face or surface when so needed. In operation, when the light source is illuminated, the lens is then lit, displaying the color of the light source or of the color of the strands.

18 Claims, 3 Drawing Sheets

CHAMELEON SIGNAL LENS

This application is a continuation-in-part of application Ser. No. 09/616,746, filed Jul. 14, 2000.

FIELD OF THE INVENTION

The present invention relates to lenses, and more particularly to signal lenses comprising a bundle of adjacent light transmitting elements.

BACKGROUND OF THE INVENTION

Light transmitting elements, including fiber optic cables, are well known for various uses. A defining trait of the fiber optic cable is its ability to transmit light from a source with minimal losses over short or long distances.

It is also known that various vehicles rely on marker lights and headlights, among others, to make them visible during evening hours as well as to provide information to others regarding turns and other vehicular movements.

Marker and headlight lenses have been used in vehicle lighting applications for many years. The lenses generally comprise a transparent plastic or glass material having a tint or color added as necessary to the application. The lens then colors the emitted light as well as providing protection to the bulb. Prior art lenses also comprise a plurality of adjacent convex lens giving a dot matrix appearance to the marker light operation.

Prior art uses of the fiber optic cable are primarily focused on transmitting light from a source to an emitter without taking advantage of other unique features of the cable, for example, light transmission efficiency over short distances and the numerical aperture. Further, the plastic lens presents a noticeable feature on a vehicle surface, regardless of the state of operation.

Representative of the art is U.S. Pat. No. 5,826,966 (1998) to Schwing that discloses a lighted bumper guide that uses a single fiber optic filament extending from a light source to allow a driver to identify the extremity or ends of the bumper of a vehicle.

Also representative of the art is U.S. Pat. No. 5,384,881 (1995) to Miller that discloses a multi-lens luminaire having a generally tubular macro-housing having a plurality of generally tubular micro-housings, each micro-housing retaining a fiber optic light guide emitting light from a remote source of illumination.

The prior art does not teach use of short fiber optic cable strands in an array used as a lens with a light source. The prior art does not teach orienting the fiber optic strands in a single lens to discriminate between different light sources. Nor does the prior art teach use of adjacent, light transmitting elements in an array. The prior art does not teach use of fiber optic strands coordinated with a vehicle surface in such a way as to render a lens invisible when not in use.

What is needed is a lens comprising a bundle of light transmitting elements. What is needed is a lens comprising a bundle of light transmitting elements inclined at an angle to a light source.

What is needed is a lens comprising a bundle of fiber optic cable strands. What is needed is a lens comprising a bundle of light transmitting elements that discriminate between different light sources.

What is needed is a lens comprising fiber optic strands coordinated with a vehicle surface in such a way as to render a marker lens invisible when not in use. The present invention meets these needs.

SUMMARY OF THE INVENTION

The primary aspect of the invention is to provide a lens comprising an array of fiber optic cable strands.

Another aspect of the invention is to provide a lens comprising an array of fiber optic cable strands inclined at an angle to a light source.

Another aspect of the invention is to provide a lens comprising an array of parallel fiber optic strands.

Another aspect of the invention is to provide a lens comprising an array of fiber optic cable strands which discriminate between different light sources.

Another aspect of the invention is to provide a lens comprising fiber optic strands coordinated with a vehicle surface in such a way as to render a marker lens invisible when not in use.

Other aspects of the invention will be pointed out or made obvious by the following description of the invention and the accompanying drawings.

The invention is a lens. The light transmitting portion of the lens comprises a plurality of fiber optic strands forming an array arranged parallel to each other in a side-by-side manner. The fiber optic strands are also inclined at an angle to a surface of the lens. This defeats any direct reflection from the interior of the lens, which gives virtual invisibility, to the lens face and when not in use, of the elements inside the lens. In operation, without the light source illuminated, it allows the lens to transmit the color of a reflective panel disposed behind the lens. In operation, with the light source illuminated, the lens is then lit displaying the color of the light source or of the color of the strands or both. In an alternate embodiment, the strands are arranged so that different groups of strands are each focused on one or a group of light sources in an array of light sources.

The chameleon effect of rendering invisible the surface of the light transmitting elements relative to vehicle's surface is achieved through one or a plurality of the following methods:

1.—The variation of the fibers' diameter $d1$ in relation to variations of the center distance $d2$ between adjacent fibers, based on the general relation between the two where $d2<d1$. To explain how this will work, a principle of its operation is similar and is used when advertising on bus windows, taxis etc. To the outside viewer, the color of the advertisement is what catches the eye. The eye is fooled into believing that the whole surface of the window is painted solid. In reality is only a mesh that has $d1$ diameter orifices spaced at $d2$ distances that is colored. The passengers inside the bus will be able to see through the window, through these perforations through the mesh.

The larger $d1$ and the smaller $d2$ the better the passengers will see and the less effective the advertisement will be (the chameleon effect).

When $d1$ is smaller and $d2$ is increased the passengers' vision will worsen (less brilliance to the signal lights), but the add will be more visible.

This invention will use the same principle and therefore a balance must be found between the various combinations of values given to $d1$ and $d2$. The purpose is to optimize the balance between the brilliance required by a signal light and the effectiveness of the chameleon effect. This balance is influenced by the specific design of the lens in a specific vehicle configuration and therefore cannot be accurately determined for all applications. However a range of $d1$ from 1.0 mm to 4.0 mm diameter and $d2$ 2.5 mm to 10 mm will probably give best results. Also, a honeycomb configuration of the fiber optic strands will give a uniform distribution of the light pattern, therefore, it will increase the effectiveness of both signal light efficiency and chameleon effect.

2.—Having the fiber optic tinted to the same color as the vehicle panel where the device is located.

3.—For light color vehicles, a light source of the same color as the vehicle's color can also be used to blend the light source's surface into the rest of the panel. The intensity of such light will vary depending on the outside or ambient light conditions (midday, dusk, etc.) and it will be automatically adjustable. When the signal light is activated an additional, much stronger red or yellow light source will turn on and override the previous.

BRIEF DESCRIPTION OF THE DRAWINGS

The accompanying drawings, which are incorporated in and form a part of the specification, illustrate a preferred embodiment of the present invention, and together with the detailed description, serve to explain the principles of the invention.

DETAILED DESCRIPTION OF THE PREFERRED EMBODIMENT

Figure 1:
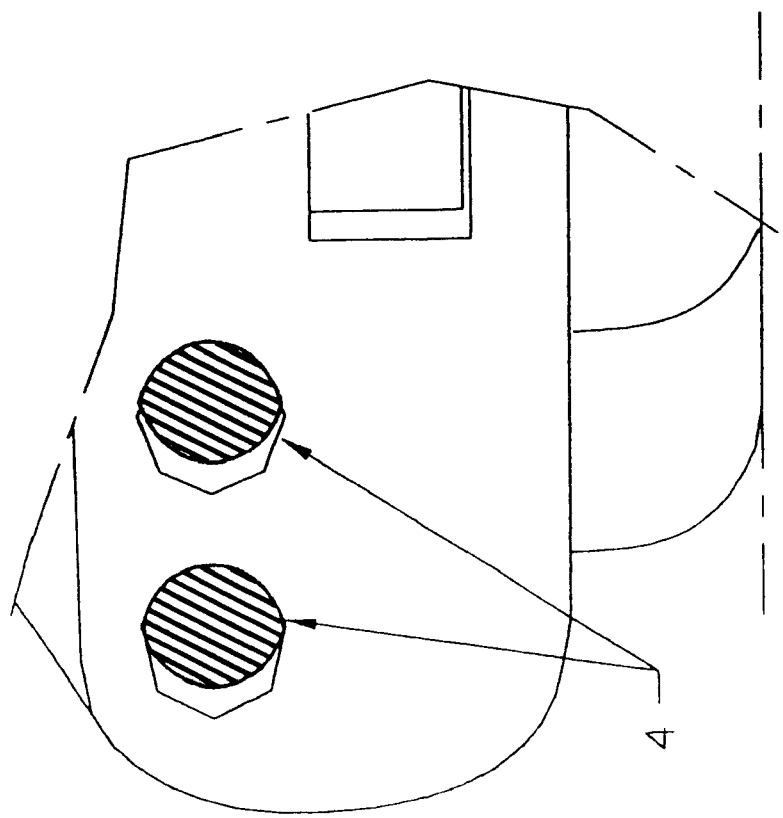
FIG. 1 is an elevational view of the prior art.

FIG. 1 is an elevation view of the prior art. The prior art lens A is shown on a vehicle bumper. The lens is immediately apparent on the surface of the bumper.

Figure 2:
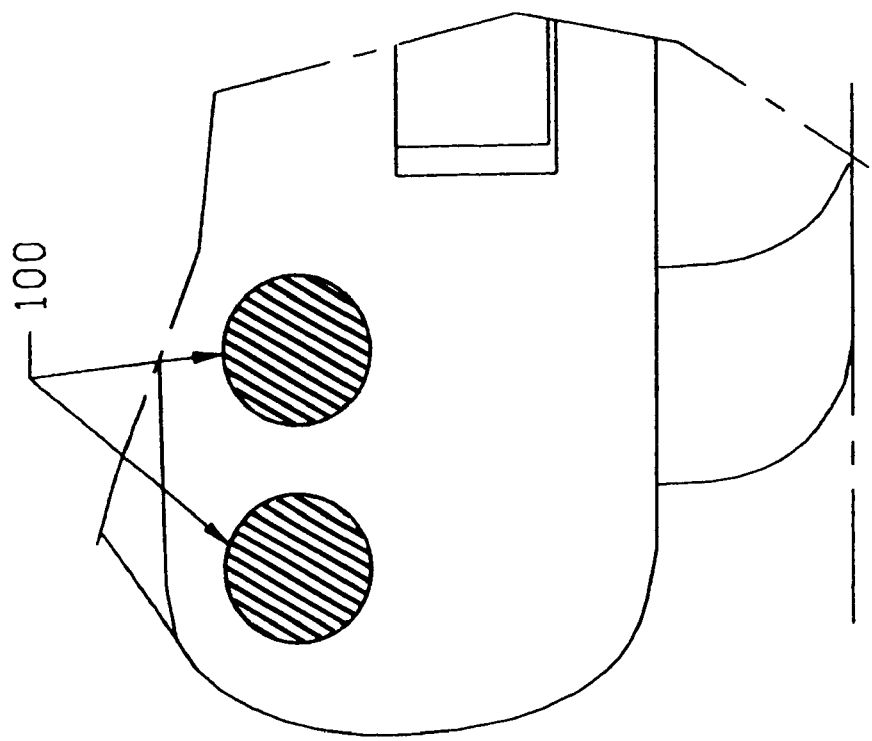
FIG. 2 is an elevational view of the inventive lens in operation.

FIG. 2 is an elevational view of the inventive lens in operation. The lens is shown in the same position as the prior art lens. The surface of the lens 100 is flush with the outer surface of the bumper structure and as such there are no ridges or depressions.

Figure 3:
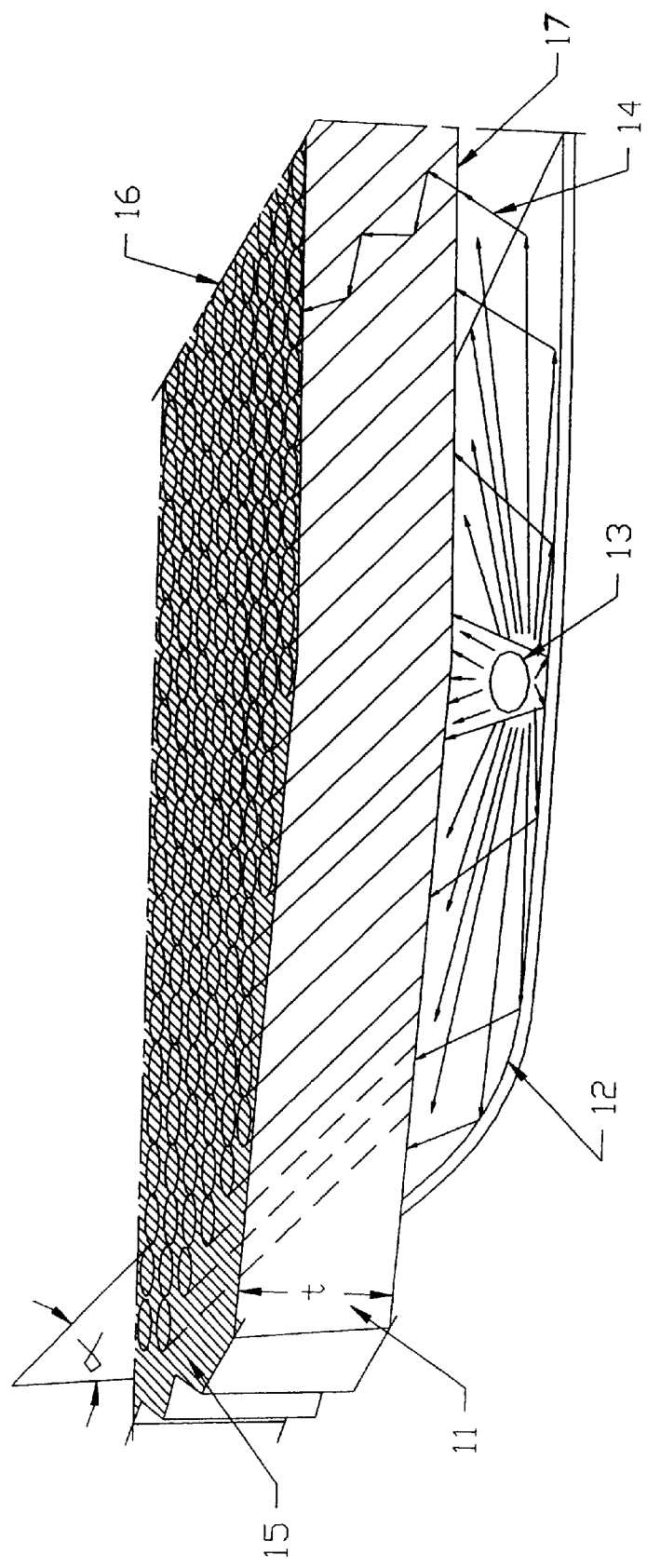
FIG. 3 is a rotated sectional view of the inventive lens.

FIG. 3. is a rotated sectional view of the inventive lens. A plurality of fiber optic strands or light transmitting elements 10 forming an array or bundle are arranged parallel to each other in a side-by-side manner. The strands are embedded or molded into the material comprising the bumper 11 or other vehicle structural component (similar to existing signal lights of today).

The bundled fiber optic strands form a substantially planar surface. However, one skilled in the art can appreciate that the strands may also be arranged so that the form of the lens-conforms to any contour required by a designer. The axis of the fiber optic strands in the lens is inclined at an angle ALPHA to a normal to surface 15. Angle ALPHA is typically in the range 0 to 45 degrees. The optimum angle is determined by the location of the major axis of each strand as compared to the location of the light source 13. More distant strands may be angled more severely toward the light source. Strands adjacent to the light source being less inclined.

In areas of the vehicle where the signal lights have no light source behind them, and the sole purpose is to reflect light from on coming vehicles, so that they are more visible (when the vehicle is parked at night) this design will require the strands' direction square to the lens surface and backing a highly reflective multi faceted, red or yellow surface that will reflect back the light.

In an alternate embodiment, the strands are arranged so that the axis of each strand is aligned with a single light source in an array of light sources. This assures maximum light gathering by each strand as a function of the light acceptance angle of each optical fiber. One skilled in the art can appreciate that different parts of the lens may have strands that are oriented toward different light sources, depending on the number and location of the light sources.

The ends 16 of the fiber optic strands are flush with an outer surface 15 of the bumper or other structure.

A reflective surface 12 is placed substantially parallel to and located to one side of the planar surface or layer of the fiber optic strands opposite the outer surface 15. The term "layer" is used here to describe any complex surface that can be used for the outer shape of the lens area. A light source 13 is placed between the reflective surface and the planar surface. A light ray 14 emitted by the light source is typically reflected by the reflective surface. It is received through an end 17 of a fiber optic strand. The light ray is transmitted through the fiber optic strand and emitted from end 16. The reflective surface may also comprise a series of reflective ridges that more efficiently reflect and thereby direct the light rays from the light source towards ends 17. The form of each ridge depends on the location of each strand in the array. The shape and arrangement of the ridges is also a function of the numerical aperture of the strands and enhance coupling the light from the light source to the strands.

A plurality or array of light sources may also be included, depending on the needs of the user. For example a yellow light source and a red light source may be used to depict a turn signal (yellow) and a brake signal (red). The light source may comprise an LED or any other light source known in the art. Each light source may also comprise the termination of a fiber optic cable routed from a remote light source.

In an alternate embodiment, a plurality of fiber optic light sources may each be connected to the end 17 of each strand. Each fiber optic light source would then be individually controllable allowing customization of the appearance of the lens during operation. The lens could display a variety of colors or text, for example "STOP", as required by a user using known light source control methods and apparatus.

The diameter of the fiber optic strands is in the range of 0.1 mm up to 25 mm. The thickness, t of the fiber optic bundle layer is set according to the design needs of the user and is not always equal to the outer surface thickness.

Figure 4:
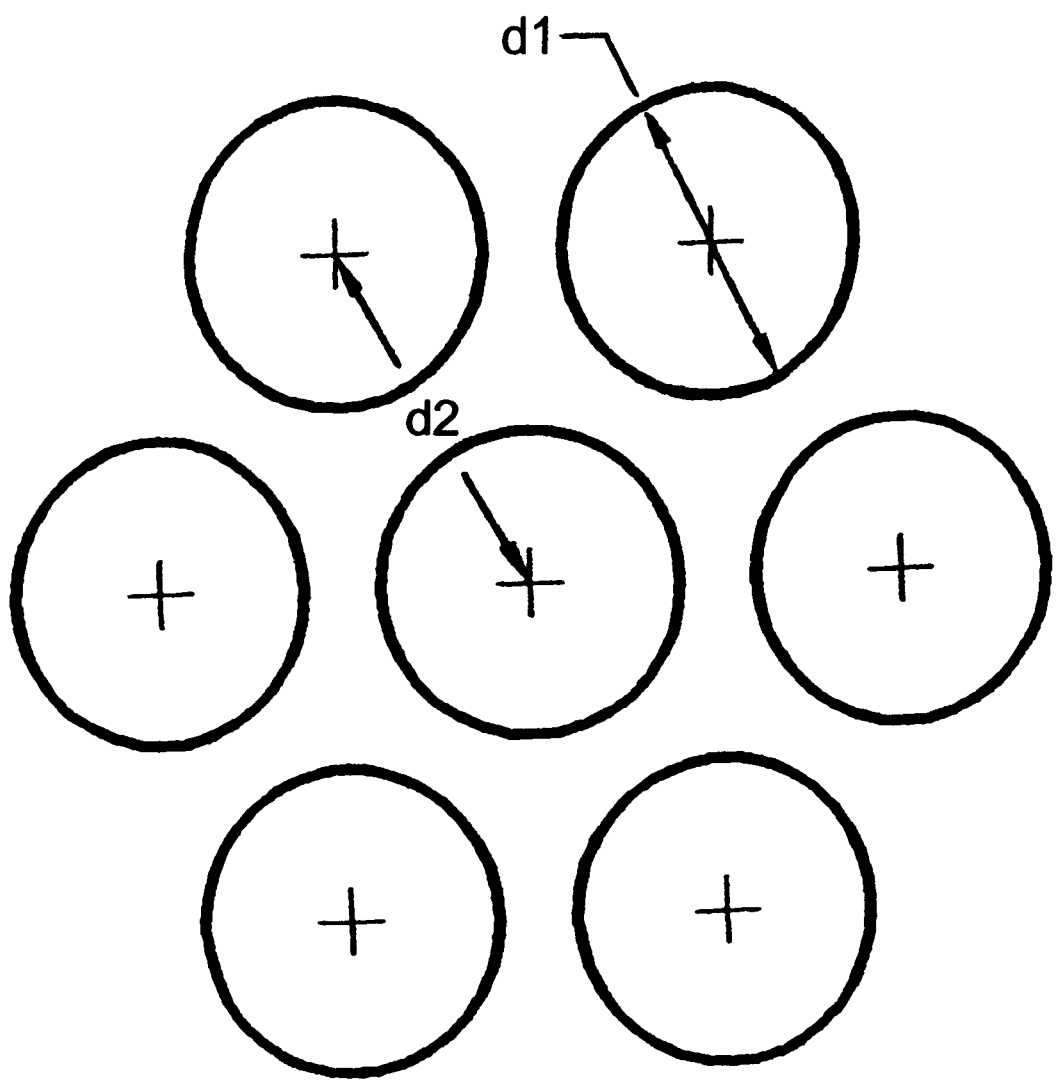
FIG. 4 is a plan view of light transmitting elements.

FIG. 4. is a plan view of light transmitting elements. Strands 10 each have a diameter d1. The figure depicts a set of strands, although the relationship can be applied to any number of strands. Connecting tangent points taken on each adjacent strand results in a triangle. Generally, the triangle will be equilateral. A line drawn from one center point to the center of the nearest fiber optic will have a length d2. In the preferred embodiment, d2>d1. The intensity of the transmitted light from the lens is a function of this relationship. Increasing d1 while holding d2 constant will increase the intensity of the emitted light. On the other hand, decreasing d1 while holding d2 constant will decrease emitted light while enhancing the chameleon effect, that is, rendering the location and appearance of the lens undetectable by an observer when the light source is not illuminated.

Although a single form of the invention has been described herein, it will be obvious to those skilled in the art that variations may be made in the construction and relation of parts without departing from the spirit and scope of the invention described herein.

I claim:

1. A signal lens system comprising:

an outer body panel having a colored exterior surface, a portion of said panel having a plurality of openings defined therethrough, said openings being spaced from each other with sections of the colored exterior surface of the panel extending between adjacent ones of the openings;

a plurality of light transmitting elements having outer ends disposed in said openings such that outer surfaces of the light transmitting elements are substantially flush with the colored exterior surface of said panel;

a light source disposed inwardly of said panel such that when the light source is activated, light projected from said light source enters inner ends of said light transmitting elements is transmitted to the outer surfaces of the light transmitting elements, and is projected from the outer surfaces; and said light transmitting elements being rendered substantially invisible against the colored exterior surface of the panel when viewed from outside the panel and when the elements are not transmitting light from the light source.

2. The signal lens system of claim 1, wherein at least some of the outer ends of said light transmitting elements have a central axes that are inclined non-perpendicularly to said panel.

3. The signal lens system of claim 1, wherein said light transmitting elements have a diameter of 1.0 mm–4.0 mm, and a distance between centers of adjacent ones of said light transmitting elements is 2.5 mm–10.0 mm.

4. The signal lens system of claim 1, wherein said light transmitting elements are optical fibers, and are tinted a color the same as that of said colored exterior surface of the panel.

5. The signal lens system of claim 1, wherein said light source emits light having a color corresponding to that of the colored exterior surface of the panel.

6. The signal lens system of claim 1, further comprising a highly reflective surface disposed opposite to the inner ends of said light transmitting elements.

7. The signal lens system of claim 1, wherein said light transmitting elements have a diameter of 1.0 mm–4.0 mm, and a distance between centers of adjacent ones of said light transmitting elements is 2.5 mm–10.0 mm.

8. The signal lens system of claim 1, comprising an array of different colored light sources disposed inwardly of said panel which project light toward the inner ends of the light transmitting elements.

9. A signal lens system comprising:

an outer body panel having a colored exterior surface, a portion of said panel having a plurality of openings defined therethrough, said openings being spaced from each other with sections of the colored exterior surface of the panel extending between adjacent ones of the openings;

a plurality of light transmitting elements having outer ends disposed in said openings, said outer ends of the light transmitting elements having a central axes that are inclined non-perpendicularly to said panel; and a light source disposed inwardly of said panel such that when said light source is activated, light projected from said light source enters inner ends of said light transmitting elements is transmitted to the outer surfaces of the light transmitting elements, and is projected from the outer surfaces.

10. The signal lens system of claim 9, wherein said central axes of the outer ends of the light transmitting elements are inclined at different angles, based on locations of the elements relative to the light source.

11. The signal lens system of claim 9, wherein the colored exterior surface of said panel is substantially flush with the outer ends of said light transmitting elements.

12. The signal lens system of claim 9, wherein said light transmitting elements comprise fiber optic strands.

13. The signal lens system of claim 12, wherein said fiber optic strands are arranged in bundles of various shapes.

14. The signal lens system of claim 12, wherein said fiber optic strands are arranged in bundles of various shapes.

15. The signal lens system of claim 9, further comprising a highly reflective surface disposed opposite to the inner ends of said light transmitting elements.

16. The signal lens system of claim 15, wherein said multiple light sources correspond to said fiber optic strand bundles.

17. The signal lens system of claim 9, comprising an array of different colored light sources disposed inwardly of said panel which project light toward the inner ends of the light transmitting elements.

18. The signal lens system of claim 12, wherein said fiber optic strands are arranged in bundles of various shapes.

* * * * *